June 12, 1962      E. A. HENRY      3,038,328
ULTRASONIC WAVE TRAIN GENERATOR
Filed June 9, 1959
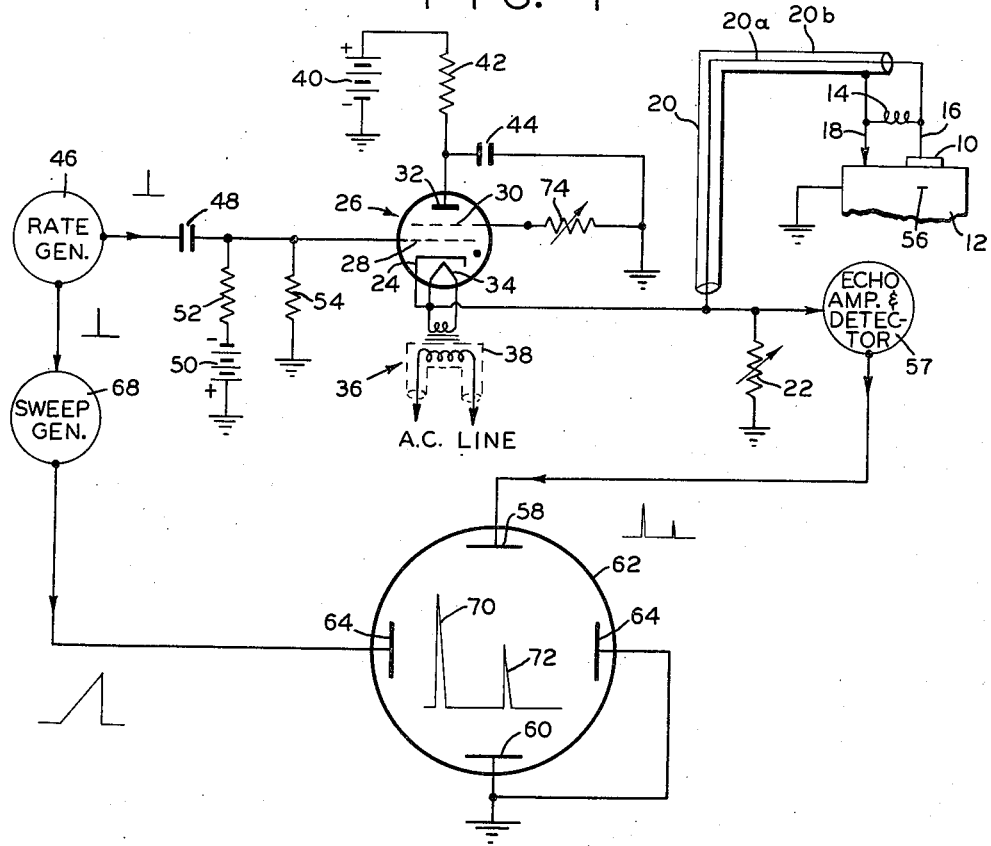
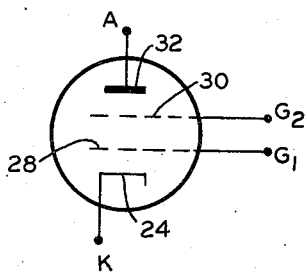
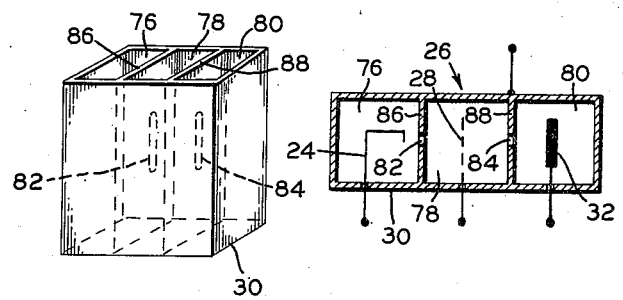

United States Patent Office 3,038,328
Patented June 12, 1962

3,038,328
ULTRASONIC WAVE TRAIN GENERATOR
Elliott A. Henry, Newtown, Conn., assignor to Branson Instruments, Inc., Stamford, Conn.
Filed June 9, 1959, Ser. No. 819,071
10 Claims. (Cl. 73—67.9)

This invention relates to improvements in ultrasonic pulse type materials inspection equipment of the general type disclosed in U.S. Patent No. 2,280,226, granted April 21, 1942, to F. A. Firestone, wherein the round-trip propagation time of a vibrational or ultrasonic wave train between the entrant surface of a part under inspection and a reflecting discontinuity, such as an internal flaw or opposite boundary of the part, is measured to ascertain the physical location of internal flaws in the test specimen or to determine the thickness of a part where access may be had to only one surface thereof. More specifically the invention relates to the generation and detection of vibrational or ultrasonic wave trains employed in such ultrasonic materials inspection equipment wherein both the sensitivity and close-to-surface resolution are greatly improved by a novel wave train generator, as herein disclosed, which provides two degrees of damping, one degree of damping for the transmitted wave train and a different degree of damping for the detected echo wave train, both degrees of damping being independently controllable by the operator.

Ultrasonic wave train generators employed in prior art ultrasonic pulse type materials inspection equipment have heretofore generated wave trains in the manner disclosed in U.S. Patent 2,398,701, granted April 16, 1946, to F.A. Firestone, in which a gaseous discharge tube periodically discharges the energy stored in a capacitor into an inductance-capacity tank circuit. The decrement of the high frequency wave, commonly referred to as the pulse length, being controlled by resistive damping and adjustable by altering the magnitude of the resistance. The resistive damping alters the Q of and therefore the impedance of the L/C tank circuit and these parameters are constant for both the generated or initial wave train and the reflected or echo wave trains for any degree of resistive damping. With this arrangement, the greater the degree of damping the shorter the generated wave train and therefore the shorter the minimum test range possible, but the lower the sensitivity in converting the vibrational wave train echoes into electrical wave trains. This undesirable loss of sensitivity for echo detection is a result of the characteristics of piezoelectric crystals used as transducers which yield an electrical output voltage inversely proportional to the electrical load impedance for a given magnitude of stress or strain. As the damping is increased the L/C tank circuit impedance decreases (the tank impedance being approximately equal to $QX_L$) and as this tank impedance constitutes the electrical load on the piezoelectric crystal, the lower the sensitivity of the crystal as an echo detector. The necessity for very high degrees of damping in order to detect defects that lie close to the entrant surface of the part may be seen from the fact that the transmitted pulse must terminate prior to the return of an echo if the echo is to be distinguished from the initial pulse, and that the initial electrical wave train may have a peak-to-peak amplitude in excess of one thousand volts with an exponential decay and the echo amplifier adjusted to be responsive to echo amplitudes as low as fifty microvolts peak-to-peak. Thus, even with high degrees of damping, several micro-seconds would elapse, corresponding to an inch or more of material, before echoes could be detected, and at the same time the sensitivity of the transducer would be severely reduced. In practice the reduction in detection sensitivity has been found to be as high as a factor of one thousand. It is therefore highly desirable to provide a wave train generator that has two degrees of damping, very high for the initial or transmitted wave train, and considerably less damping for echo wave trains in order to increase the close-to-surface resolution without the loss of sensitivity to echo wave trains that is characteristic of the prior art.

The invention has therefore as its principal object to provide, an ultrasonic pulsed echo materials inspection device characterized by very high close-to-surface resolution and very high sensitivity to weak echo signals from small discontinuities within the part.

It is a further object of the invention to provide an ultrasonic wave train generator characterized by two degrees of damping of the oscillatory circuit.

It is a further object of the invention to provide an ultrasonic wave train generator wherein the generated wave train has a high and controllable decrement and where the damping means is automatically disconnected at the termination of the wave train.

It is yet a further object to provide an ultrasonic wave train generator characterized by a relatively low and controllable damping of the oscillatory circuit during the quiescent state and a high damping controllable from critical damping to a relatively lower damping during the quasi-stable state, said quasi-stable state damping being automatically disconnected at the termination of the quasi-stable state.

Further objects and advantages of the invention will become apparent from the following detailed description thereof.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

FIGURE 1 is a schematic representation, partly in block form, of an ultrasonic material inspection instrument incorporating the principles of my invention, FIGURE 2 is an enlarged schematic diagram of a thyratron of the type used in the circuit of FIGURE 1, FIGURE 3 is an idealized perspective view of the shield grid of the thyratron used in the circuit of FIGURE 1, and FIGURE 4 is a partly schematic representation of the thyratron, showing the physical interrelation of the various electrodes thereof.

Referring to the block and schematic drawing of FIGURE 1, there is shown a rate generator 46 which may take the form of an astable multivibrator, free running blocking oscillator or the like, which provides the clock or timing signals and usually produces trigger signals at rates between sixty and one thousand pulses per second (p.p.s.). These trigger or synchronizing signals are coupled to two circuits, the sweep generator 68 which generates a linear sawtooth of voltage that is applied to one of the horizontal deflecting plates 64 of the cathode ray tube 62, and the other trigger signal is coupled to the control grid 28 of the thyratron tube 26 through capacitor 48. Thyratron tube 26 has been held non-conducting in the quiescent state by the negative bias voltage applied to the control grid 28 from the bias supply 50 and the voltage dividing resistors 52 and 54. During the quiescent period capacitor 44 has been charged toward the positive potential of the anode supply 40. The charge is exponential but if the time constant of capacitor 44 and resistor 42 is one third the period between initiating triggers from the rate generator 46, the charge on capacitor 44 will be ninety-five percent of $E_{bb}$, the potential of the anode supply 40. The number two or shield grid 30 of the thyratron tube 26 is connected to ground through a variable resistor 74 and the cathode 24 is connected to one terminal of the heater 34 and to ground through variable resistor 22. The heater/cathode connection in conjunction with the low capacity to ground floating heater winding of transformer 36, which is provided with an electrostatic shield 38, prevents breakdown between heater and cathode when tube 26 conducts. The cathode 24 of thyratron tube 26 is also connected to one end of the transducer cable 20, comprising inner conductor 20a and outer shield 20b, the other end 16 of which is terminated by the piezoelectric crystal 10, shunted by the pulse coil 14, through its connection to conductor 18 which connects cable shield 20b with grounded work piece 12. The inductance of pulse coil 14, and the capacitance of cable 20 and transducer 10 form the oscillatory or resonant tank circuit. The cathode 24 is also coupled to the input of the echo amplifier 57 and both the initial wave train and echo wave trains are thus coupled to the amplifier 57. The signals introduced to the echo amplifier 57 are amplified, rectified and further amplified in this amplifier and appear in the output as unidirectional pulses that are applied to one of the vertical deflecting plates 58 of the cathode ray tube 62. The cathode ray tube then produces a plot of echo amplitude versus time or distance from the entrant surface of a test specimen such as work piece 12, having defect 56. Pip 70 on the screen of cathode ray tube 62 represents the initial wave train at the entrant surface of the test specimen 12 and pip 72 represents the echo from the defect 56.

The value of variable resistor 22 is adjusted to provide the desired degree of damping of the tank circuit, coil 14 and associated capacity, during the quiescent period of the thyratron tube 26 when echo wave trains are received, and resistor 74 is adjusted to provide the desired degree of damping for the initial wave train. This variable resistor 74 controls the decrement of the initial pulse, the operation of which will be subsequently explained in detail. When the trigger from the rate generator 46 arrives at the control grid 28 of the thyratron 26 the tube conducts and the energy stored in capacitor 44 is discharged into the tank circuit, essentially coil 14 and the cable 20 capacity, through the plasma formed between the anode 32 and cathode 24 of the thyratron tube 26, thus shock exciting the tank circuit which generates an exponentially decaying wave train at the resonant frequency of the tank circuit and whose decrement is controlled by the Q of the tank circuit. The electrical wave train thus generated is applied to the piezoelectric crystal 10 which transforms the electrical vibrations into mechanical vibrations which are in turn coupled into the entrant surface of the test specimen 12 through a suitable couplant such as light oil (not shown). The mechanical vibrations propagate into the test specimen 12 and upon encountering the defect 56, a portion of the energy is reflected back toward the transducer 10, and upon arriving at the transducer 10 the mechanical or acoustic energy is converted into electrical energy and the resultant electrical wave train is coupled to the echo amplifier 57 and processed as previously described.

To explain how the two degrees of damping are obtained reference is made to FIGURES 2, 3 and 4. FIGURE 2 shows the schematic form that designates the four elements of the tetrode thyratron tube 26, which may be, for example, a Retma type 2D21. FIGURE 3 illustrates the geometry of the number two, or shield grid 30. This element may be seen to take the form of a three compartment box, rectangular in shape, comprising compartments 76, 78 and 80, with small narrow slots 82 and 84 in the center of the compartment dividers 86 and 88. As may be seen in FIGURE 4, the first of these compartments, 76, contains the cathode 24; the second compartment, 78, contains the control grid 28; and the third compartment, 80, contains the anode 32. The elements are so arranged that electrons emitted by the hot cathode 24 must pass through both slots 82 and 84 to arrive at the anode 32 and would be, of course, repelled by the negative potential of the control grid 28. Examination of these illustrations will show that the cathode 24 and its compartment 76 form a gas diode, the compartment wall 30 becoming the anode of the diode thus formed. When the tube 26 fires the major plasma is formed between the anode 32 and cathode 24, but a less dense plasma is formed in all three compartments 76, 78 and 80, as a result of random collision of electrons and ions with the enclosed gas molecules. The conducting impedance of the gas diode formed by the cathode 24 and the number two grid 30 has been found to be on the order of magnitude of one ohm, and when the value of resistor 74 is made zero this low impedance will critically damp the oscillatory tank circuit previously described. Under the above condition the first half cycle would not be impeded by the gas diode as the voltage between cathode 24 and ground is in opposition to the direction of diode conduction. However, when the polarity of the voltage reverses, a result of the ringing of the tank circuit, the gas diode conducts and the energy stored in the tank circuit is dissipated in the form of heat. The thyratron 26 then deionizes as the anode 32 potential has fallen lower than the deionization potential and the diode impedance becomes very high, a result of a large spacing between the cathode 24 and the compartment walls of the suppressor grid 30 that form the diode anode. It is then apparent that the conducting impedance of the gas diode previously discussed can be made any value desired by placing resistance, such as variable resistor 74 in FIGURE 1, in series with one of the elements, preferably the gas diode anode 30.

By these means the decrement of the generated wave train may be made any value greater than the quiescent value controlled by variable resistor 22 by adjustment of the value of variable resistor 74, and the extra damping is automatically applied during the quasi-stable state when the initial wave train is generated and automatically disconnected when the thyratron 26 deionizes at the termination of the wave train.

It will thus be seen that the objects set forth above, among those made apparent from the preceding description, are efficiently attained and, since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim and desire to secure by Letters Patent is:

1. Ultrasonic inspection apparatus comprising, in combination,
   (a) an electroacoustic transducer,
   (b) means forming a resonant circuit connected with said transducer,
   (c) means for applying an electrical impulse to said transducer,
   (d) said resonant circuit being energized by said electrical impulse whereby electrical oscillations are induced therein, and
   (e) electrical damping means operated by said oscillations to damp said transducer during the second half-cycle of oscillation.

2. The combination defined in claim 1 in which said damping means is a resistor and a diode connected in series, the series combination of said diode and said resistor being in parallel with said transducer, whereby said diode may conduct during said second half cycle and thereby dissipate substantially all of the energy in said transducer energizing means.

3. The combination defined in claim 1 including further damping means connected in parallel with said transducer throughout operation of said apparatus.

4. Acoustical inspection apparatus comprising, in combination, an electroacoustic transducer, a tank circuit including said transducer, a first damping resistor connected in parallel with said circuit, a source of electrical energy, first switching means adapted to connect said source to said tank circuit to apply an electrical wave train thereto, a second resistor, second switching means adapted to connect said second resistor in parallel with said tank circuit for a brief interval occurring shortly after the application of said electrical wave train to said tank circuit by said first switching means, whereby said tank circuit has a relatively low Q shortly after application of said wave train and a high Q thereafter.

5. The combination defined in claim 4 in which said second switching means is a diode connected in series with said second resistor, the series combination of said diode and said second resistor being in parallel with said tank circuit and adapted to conduct during the second half cycle of the resonant frequency of said tank circuit following said application of said electrical wave train.

6. The combination defined in claim 4 in which said first switching means is a thyratron including a cathode, control grid, anode and shield grid, said source being connected to said tank circuit through cathode-anode conduction controlled by said control grid, said second resistor being connected to said shield grid, said second resistor, said shield grid and said cathode comprising a series circuit in parallel with said tank circuit.

7. The combination defined in claim 1 including means for displaying the electrical signals appearing across said transducer, said signals including said electrical impulse and the reflections of acoustical energy back to said transducer from discontinuities in the object being inspected by said apparatus.

8. Ultrasonic inspection apparatus comprising, in combination, an electroacoustic transducer, an ultrasonic source of electrical energy including a thyratron control device having an anode, cathode, control grid and shield grid, coupling means including a tank circuit connecting said energy source with said transducer, a first damping resistor connected in parallel with said coupling means, a second damping resistor connected between the shield grid of said thyratron and ground, and switching means comprising the cathode and shield grid of said thyratron connected in series with said second resistor to apply said second resistor in parallel with said coupling means tank circuit during the second half cycle of resonant oscillations in said tank circuit, whereby a greater degree of electrical damping is applied to electrical oscillations in said tank circuit following each first half cycle of oscillatory energy introduced thereto, and a lesser degree of damping is applied to each first half cycle thereof.

9. In supersonic inspection apparatus, the combination with an electroacoustic transducer, means for indicating electric signals developed in said transducer, and resistive damping means for damping said transducer, of a gas-filled electron tube, a first pair of electrodes in said tubes, said first pair of electrodes being connected in series between a voltage source and said transducer, means providing a second pair of electrodes connected in series between said damping means and said transducer, and means for ionizing the gas in said tube, whereby conduction between said first pair of electrodes applies an electric signal to said transducer and conduction between said second pair of electrodes connects said damping means in parallel with said transducer.

10. The combination defined in claim 9 in which said second pair of electrodes forms a gas diode with said gas, said diode being connected to conduct during the second half-cycle of the wave train developed in said transducer by the applied electric signal.

References Cited in the file of this patent
UNITED STATES PATENTS

| | | |
|---|---|---|
| 2,398,701 | Firestone | Apr. 16, 1946 |
| 2,562,450 | De Lano | July 31, 1951 |
| 2,740,289 | Van Valkenburg et al. | Apr. 3, 1956 |